United States Patent
Omori et al.

(10) Patent No.: US 12,434,466 B2
(45) Date of Patent: Oct. 7, 2025

(54) METHOD FOR PRODUCING MICROWAVE-RESISTANT SHEET FOR HEAT-INSULATING FOAMED PAPER CONTAINER

(71) Applicant: NISSIN FOODS HOLDINGS CO., LTD., Osaka (JP)

(72) Inventors: Noboru Omori, Osaka (JP); Yosuke Nakatani, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 1023 days.

(21) Appl. No.: 17/281,141

(22) PCT Filed: Feb. 18, 2020

(86) PCT No.: PCT/JP2020/006156
§ 371 (c)(1),
(2) Date: Mar. 29, 2021

(87) PCT Pub. No.: WO2020/171032
PCT Pub. Date: Aug. 27, 2020

(65) Prior Publication Data
US 2021/0339518 A1 Nov. 4, 2021

(30) Foreign Application Priority Data
Feb. 20, 2019 (JP) ................. 2019-028273

(51) Int. Cl.
*B32B 37/15* (2006.01)
*B32B 5/20* (2006.01)
(Continued)

(52) U.S. Cl.
CPC .............. *B32B 37/153* (2013.01); *B32B 5/20* (2013.01); *B32B 27/10* (2013.01); *B32B 27/32* (2013.01);
(Continued)

(58) Field of Classification Search
CPC .................................................. B32B 37/153
See application file for complete search history.

(56) References Cited

U.S. PATENT DOCUMENTS

| 4,435,344 A | 3/1984 | Iioka | |
|---|---|---|---|
| 6,521,734 B1 * | 2/2003 | Araki | B32B 37/153 526/352.2 |

(Continued)

FOREIGN PATENT DOCUMENTS

| JP | S57-110439 | 7/1982 |
|---|---|---|
| JP | H05-042929 | 2/1993 |

(Continued)

OTHER PUBLICATIONS

Machine translation of WO2008038750 (Year: 2008).*

(Continued)

*Primary Examiner* — Scott W Dodds
(74) *Attorney, Agent, or Firm* — HSML P.C.

(57) ABSTRACT

An examination of microwave oven-resistant sheets for heat-insulating foamed paper containers revealed that blisters occur in the containers in the course of microwave oven treatment. That is to say, the present invention addresses the problem of providing a sheet for heat-insulating foamed paper container such that no blisters occur during microwave oven treatment. The present inventors have found that the problem to be solved by the present invention can be solved by a method for producing a sheet for a heat-insulating foamed paper container, wherein an air gap of 150 mm or larger, a drawing speed of 65 m/minute or lower, and a polyethylene resin density of 923 to 930 kg/m³.

6 Claims, 3 Drawing Sheets

(51) Int. Cl.
  *B32B 27/10* (2006.01)
  *B32B 27/32* (2006.01)
  *B32B 29/00* (2006.01)
  *B65D 3/06* (2006.01)
  *B65D 25/36* (2006.01)

(52) U.S. Cl.
  CPC .............. *B32B 29/007* (2013.01); *B65D 3/06* (2013.01); *B65D 25/36* (2013.01); *B32B 2266/025* (2013.01); *B32B 2307/304* (2013.01); *B32B 2307/72* (2013.01); *B32B 2307/7246* (2013.01); *B32B 2309/14* (2013.01); *B32B 2317/12* (2013.01); *B32B 2323/04* (2013.01); *B32B 2439/02* (2013.01)

(56) References Cited

U.S. PATENT DOCUMENTS

| | | | | |
|---|---|---|---|---|
| 2010/0112335 | A1* | 5/2010 | Suzuki | B29C 48/9155 428/318.6 |
| 2015/0274856 | A1 | 10/2015 | Berbee et al. | |
| 2016/0319053 | A1 | 11/2016 | Berbee et al. | |
| 2018/0319910 | A1 | 11/2018 | Berbee et al. | |

FOREIGN PATENT DOCUMENTS

| | | |
|---|---|---|
| JP | 2001-097355 | 4/2001 |
| JP | 2005-119147 | 5/2005 |
| JP | 2007-090662 | 4/2007 |
| JP | 2007-168178 | 7/2007 |
| JP | 2008-105747 | 5/2008 |
| JP | 2012-214038 | 11/2012 |
| JP | 2015-196529 | 11/2015 |
| JP | 2015-535035 | 12/2015 |
| JP | 2018-094906 | 6/2018 |
| JP | 2019-111650 | 7/2019 |
| WO | 2008-038750 | 4/2008 |
| WO | 2008/129653 | 10/2008 |

OTHER PUBLICATIONS

Office Action issued for Chinese Patent Application No. 202080005243.8, Aug. 2, 2022, 13 pages including machine translation.

International Search Report and Written Opinion of PCT/JP2020/006156, Apr. 21, 2020, 11 pages including English translation of the International Search Report.

* cited by examiner

METHOD FOR PRODUCING MICROWAVE-RESISTANT SHEET FOR HEAT-INSULATING FOAMED PAPER CONTAINER

TECHNICAL FIELD

The present invention relates to a method for producing a microwave-resistant sheet for a heat-insulating foamed paper container.

BACKGROUND ART

In general, heat-insulating containers are used for containers for instant cup noodles and containers for hot foods and drinks such as coffee and soup.

Containers made of foamed polystyrene are conventionally known as heat-insulating containers to be used for such applications. However, such containers are bulky because their whole bodies are foamed, and the bulkiness disadvantageously leads to increased garbage. In addition, their strength is lower than those of containers made of paper, causing a problem in that hard contents (e.g., noodle lumps) contained in such containers easily brake during transportation.

Techniques are disclosed to solve the problems (Patent Literatures 1 to 3), wherein a heat-insulating foamed paper container is produced in such a manner that a polyethylene resin with low melting point is laminated on the outer wall surface of a paper container and foamed by heating with utilizing the vapor pressure of moisture contained in paper which is the substrate. However, it is disadvantageously difficult to control the foamed layer (heat-insulating layer).

Examples of known methods to control the foamed layer include a method of controlling the composition of polyethylene resin and the moisture content and basis weight of a paper substrate (Patent Literature 4), a method of controlling the Oken smoothness and air resistance of a surface of a paper substrate onto which a polyethylene layer is to be laminated (Patent Literature 5), and a method of controlling the molecular weight distribution, melt flow rate, and melt strength of polyethylene resin (Patent Literature 6).

CITATION LIST

Patent Literature

Patent Literature 1: Japanese Patent Laid-Open No. 57-110439
Patent Literature 2: Japanese Patent Laid-Open No. 05-042929
Patent Literature 3: Japanese Patent Laid-Open No. 2001-097355
Patent Literature 4: Japanese Patent Laid-Open No. 2007-168178
Patent Literature 5: Japanese Patent Laid-Open No. 2012-214038
Patent Literature 6: Japanese Patent Laid-Open No. 2018-094906

SUMMARY OF INVENTION

Technical Problem

On the basis of the prior arts, the present inventors examined microwave-resistant sheets for a heat-insulating foamed paper container, and have revealed a problem of generation of blisters in containers in the course of microwave treatment. Thus, an object of the present invention is to provide a sheet for a heat-insulating foamed paper container, wherein the sheet generates no blisters in microwave treatment. "Microwave resistance" will be separately described later in detail.

Solution to Problem

The present inventors have found that the object of the present invention is achieved with a method for producing a sheet for a heat-insulating foamed paper container, wherein the air gap is 150 mm or larger, the drawing speed is 65 m/min or lower, and the density of a polyethylene resin is 923 to 930 kg/m$^3$.

Advantageous Effects of Invention

The completion of the present invention has enabled provision of a microwave-resistant sheet for a heat-insulating foamed paper container, and a heat-insulating foamed container.

DESCRIPTION OF EMBODIMENTS

Figure 1:
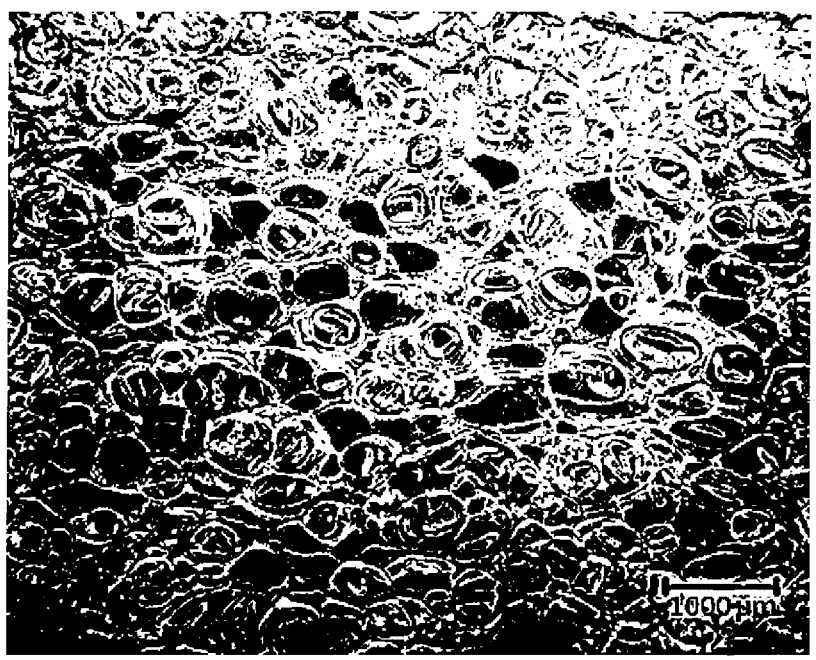
FIG. 1 shows an enlarged planar image of a foamed layer of a heat-insulating foamed container obtained from sheet C1, presenting a reference for "good" in appearance evaluation before evaluation of microwave resistance. It can be seen that fine, uniform foam cells are present in the foamed layer.

The present invention relates to a method for producing a sheet for a heat-insulating foamed paper container, the method including laminating a polyethylene resin on at least one surface of a paper substrate, wherein laminate conditions include an air gap of 150 mm or larger and a drawing speed of 65 m/min or lower, and wherein density of the polyethylene resin is 923 to 930 kg/m$^3$. Hereinafter, the details will be described.

Paper Substrate

The paper substrate to constitute the sheet for a heat-insulating foamed paper container of the present invention is not limited, and Kraft paper and woodfree paper can be used. In order to achieve toughness for containers, the basis weight of the paper substrate is preferably 150 to 400 g/m$^2$, and more preferably 250 to 350 g/m$^2$. Further, in order to foam polyethylene in a preferred manner, the moisture contained in the paper substrate is preferably 5 to 10% by weight, and more preferably 6 to 8% by weight.

Polyethylene Resin

The polyethylene resin in the present invention is an essential component in the present invention because of its superiority in laminate suitability and foaming properties. Here, the density of the polyethylene resin to be used for the foamed layer is needed to be 923 to 930 kg/m$^3$, and more preferably 924 to 926 kg/m$^3$. If a polyethylene resin having a density of lower than 923 kg/m$^3$ is used, foam cells join together and bloat to generate blisters in microwave cooking. Moreover, when the container is cooled, the heat-insulating foamed layer collapses in regions where blisters are generated, which deteriorates the heat-insulating properties.

If a polyethylene resin having a density of higher than 930 kg/m$^3$ is used, by contrast, the polyethylene resin insufficiently foams, and it is difficult to obtain a uniform foamed layer in the stage of primary foaming (formation of a foamed layer), and needless to say, evaluation of microwave resistance is impossible.

The melting point of the polyethylene resin is preferably 108 to 117° C., and more preferably 111° C. to 115° C. If a polyethylene resin having a melting point of lower than 108° C. is used, foam cells join together and bloat to generate blisters in microwave cooking. Moreover, when the container is cooled, the heat-insulating foamed layer collapses in regions where blisters are generated, which deteriorates the heat-insulating properties. If a polyethylene resin having a melting point of higher than 117° C. is used, by contrast, the polyethylene resin insufficiently foams, and it is difficult to obtain a uniform foamed layer in the stage of primary foaming (formation of a foamed layer).

Although the density of the polyethylene resin to be used for the non-foamed layer is not limited, it is preferable to set the density of it to 935 kg/m$^3$ or higher so as to prevent it from foaming in primary foaming.

The melt flow rate (also referred to as "MFR" hereinafter) of the polyethylene resin is preferably 4 to 15 g/10 min, and more preferably 6 to 10 g/10 min. If the melt flow rate is in the mentioned range, the extrusion formability of the polyethylene resin layer is good.

Conditions for Extrusion Lamination

An appropriate method of extrusion lamination can be selected from single lamination methods, tandem lamination methods, sandwich lamination methods, coextrusion lamination methods, and so on.

The temperature of the polyethylene resin (immediately beneath the T-die) in lamination is preferably 260 to 350° C., and more preferably 280 to 330° C. This range can provide a preferred laminate strength between the polyethylene resin layer and the paper substrate and a preferred appearance after foaming. It is preferable to control the surface temperature of a cooling roll in the range of 10 to 50° C.

The thickness of the polyethylene resin layer after lamination (before foaming) is not limited, and preferably 30 to 150 μm, and more preferably 40 to 100 μm. This range can impart a sufficient thickness to the polyethylene resin layer after foaming, and hence good heat-insulating properties are provided.

The drawing speed in the present invention is 65 m/min or lower. If the drawing speed is higher than 65 m/min, the air gap-passing time becomes shorter, resulting in deteriorated appearance after primary foaming. The details will be described later.

Next, the air gap will be described. Herein, the air gap refers to the distance from the extrusion exit of the T-die to nip rolls.

The air gap in lamination is needed to be 150 mm or larger, and more preferably 160 mm or larger. Extension of the air gap enables lamination while retaining an oxide film generated on the surface of the polyethylene resin, and hence a good foamed layer can be obtained. The details will be described later.

By contrast, excessive extension of the air gap causes neck-in to the polyethylene resin to result in lowered productivity, and thus with respect to the upper limit, the air gap is preferably 250 mm or smaller, and more preferably 200 mm or smaller.

Although the details of the mechanism are not clear, the present inventors infer as follows.

During the passing of the polyethylene resin through the air gap, an oxide film is generated on the surface of the resin. Since this oxide film is tougher than the polyethylene resin layer in the inner side, the oxide film can contribute to the formation of a uniform foamed layer by suppressing partial excessive foaming. Accordingly, it is important to laminate with retaining the oxide film.

However, the oxide film is likely to be lost principally in stretching the polyethylene resin with nip rolls. Specifically, force to extend the resin and force to push the resin in are instantly applied in nipping and thus cause the oxide film to break or to mix with the inner resin, resulting in the loss of the oxide film.

Lowering of the drawing speed is contemplated as a method for retaining the oxide film. If the drawing speed is lowered, the speed of nip rolls is also lowered, and as a result the manner of application of force becomes slow to allow stretching with the oxide film retained. However, lowering of the drawing speed disadvantageously leads to lowered productivity.

The present inventors solved this problem by extending the air gap.

In general, the thickness of a polyethylene resin extruded from a T-die is not uniform, being the largest immediately after the polyethylene resin is extruded from the T-die, and the smallest immediately before the polyethylene resin is nipped. Moreover, if the air gap is extended, the thickness of the polyethylene resin immediately before nipping becomes even smaller than that before extending the air gap. For this reason, extension of the air gap provides the polyethylene resin immediately before nipping with a smaller thickness to slow down the application of force to the polyethylene resin in nipping, and hence the loss of the oxide film can be suppressed.

Next, air gap-passing time will be described. Here, air gap-passing time refers to the period of time in which the polyethylene resin extruded from the T-die passes through the air gap.

The air gap-passing time is more preferably 0.16 seconds or longer. As described above, although the oxide film formed on the surface of the polyethylene resin is important to obtain a uniform foamed layer, the oxide film is insufficiently formed if the air gap-passing time is excessively short. When a sufficient air gap-passing time cannot be ensured (e.g., 0.04 seconds), treatment with ozone gas and/or oxygen gas can achieve the same effect as prolongation of the air gap-passing time.

With respect to the upper limit, the air gap-passing time is preferably 0.30 seconds or shorter, and more preferably 0.20 seconds or shorter. Excessively long air gap-passing time causes neck-in to the polyethylene resin to result in lowered productivity, and thus is not preferable.

In the present invention, it is preferable to perform surface treatment with ozone gas and/or oxygen gas while the polyethylene resin is passing through the air gap. Surface treatment with ozone gas and/or oxygen gas can promote the formation of the oxide film and improve the adhesive strength to the substrate layer. The amount of ozone gas and/or oxygen gas for treatment is not limited, and preferably 0.5 mg/m$^2$ or more for promotion of the oxidation of the polyethylene resin.

EXAMPLES

First, a list of low-density polyethylene resins used in Examples is shown in Table 1.

TABLE 1

| Table 1 | Product name | Density (kg/m$^3$) | Melting point (° C.) | MFR (g/10 min) |
|---|---|---|---|---|
| B1 | Petrothene 222 (manufactured by Tosoh Corporation) | 925 | 112 | 8.0 |
| B2 | NOVATEC LD LC720 (manufactured by Japan Polyethylene Corporation) | 922 | 110 | 9.4 |
| B3 | NOVATEC LD LC701 (manufactured by Japan Polyethylene Corporation) | 918 | 106 | 14 |

Example 1

(Step 1) Medium-density polyethylene resin (A) was extrusion-laminated on one surface of a paper substrate to form a water vapor barrier layer.
(Step 2) Subsequently, low-density polyethylene resin (B) was extrusion-laminated on the non-laminated surface to form a foamed layer, and thus sheet for a heat-insulating foamed paper container C1 (referred to as "sheet C1" hereinafter) was produced. Detailed lamination conditions are as follows.
(Step 1)
　Paper substrate: moisture content: 23 g/m$^2$, basis weight: 320 g/m$^2$
　Medium-density polyethylene resin (A1): "Petrothene LW04-1" manufactured by Tosoh Corporation, MFR: 6.5 g/10 min, density: 940 kg/m$^3$
　Extrusion temperature (T-die exit temperature): 320° C.
　Drawing speed (lamination speed): 80 m/min
　Air gap: 130 mm
　Air gap-passing time: 0.10 seconds
　Thickness: 40 μm (thickness of center portion of polyethylene resin layer)
(Step 2)
　Low-density polyethylene resin (B1): density: 925 kg/m$^3$, melting point: 112° C., MFR: 8.0 g/10 min
　Extrusion temperature (T-die exit temperature): 320° C.
　Drawing speed (lamination speed): 60 m/min
　Air gap: 160 mm
　Air gap-passing time: 0.16 seconds
　Thickness: 70 μm (thickness of center portion of polyethylene resin layer)

The low-density polyethylene resin, air gap, and drawing speed in Example 1 were changed as shown in Table 2 to produce sheets C2 to C7 (Examples 2 to 7) and sheets D1 to D4 (Comparative Examples 1 to 4). "Low-density PE" in the table refers to low-density polyethylene resin.

Each of sheets C1 to C7 and sheets D1 to D4 for a heat-insulating foamed paper container was formed into a cup having a diameter of 96 mm and a height of 107 mm, and heated at 120° C. for 6 minutes to foam (primary foaming), and thus heat-insulating foamed paper containers were produced.

TABLE 2

| | | Example 1 Sheet C1 | Example 2 Sheet C2 | Example 3 Sheet C3 | Example 4 Sheet C4 | Example 5 Sheet C5 | Example 6 Sheet C6 | Example 7 Sheet C7 | Comparative Example 1 Sheet D1 | Comparative Example 2 Sheet D2 | Comparative Example 3 Sheet D3 | Comparative Example 4 Sheet D4 |
|---|---|---|---|---|---|---|---|---|---|---|---|---|
| Low-density PE | | B1 | B1 | B1 | B1 | B1 | B1 | B2 | B1 | B1 | B1 | B3 |
| | Density (kg/m$^3$) | 925 | 925 | 925 | 925 | 925 | 925 | 922 | 925 | 925 | 925 | 918 |
| | Melting point (° C.) | 112 | 112 | 112 | 112 | 112 | 112 | 110 | 112 | 112 | 112 | 106 |
| | MFR (g/10 min) | 8.0 | 8.0 | 8.0 | 8.0 | 8.0 | 8.0 | 9.4 | 8.0 | 8.0 | 8.0 | 14.0 |
| Lamination conditions | Air gap (mm) | 160 | 150 | 180 | 200 | 160 | 160 | 160 | 140 | 160 | 160 | 160 |
| | Drawing speed (m/min) | 60 | 60 | 60 | 60 | 50 | 40 | 60 | 60 | 70 | 80 | 60 |
| Evaluation of primary foaming | | good (reference) | fair | good | good | good | good | good | poor (reference) | poor | poor | good |
| Evaluation of microwave resistance (evaluation of secondary foaming) | | good | fair | good | good | good | good | fair | poor | poor | poor | poor |

(Appearance Evaluation Before Evaluation of Microwave Resistance (Evaluation of Primary Foaming))

Figure 2:
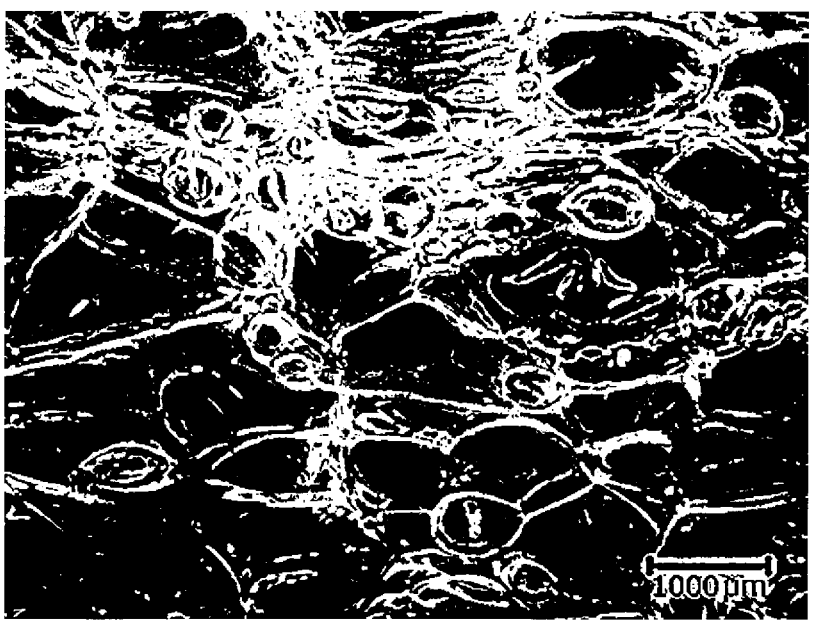
FIG. 2 shows an enlarged planar image of a foamed layer of a heat-insulating foamed container obtained from sheet D1 (Comparative Example 1), presenting a reference for "poor" in appearance evaluation before evaluation of microwave resistance. It can be seen that foam cells are bloated and nonuniform.
Figure 3:
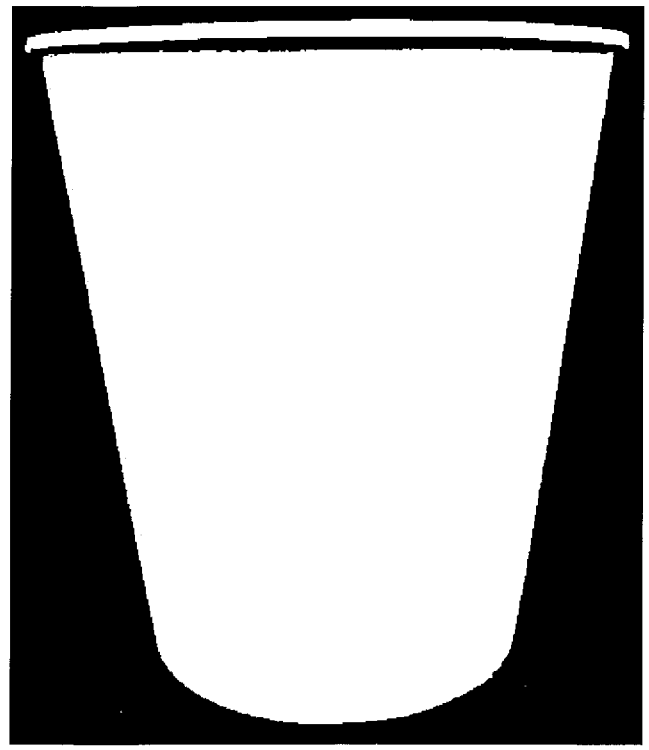
FIG. 3 shows the appearance of a heat-insulating foamed container obtained from sheet D4 (Comparative Example 4) before microwave treatment.
Figure 4:
FIG. 4 shows the appearance of the heat-insulating foamed container obtained from sheet D4 (Comparative Example 4) immediately after microwave treatment. It can be seen that blisters were generated by microwave treatment.
Figure 5:
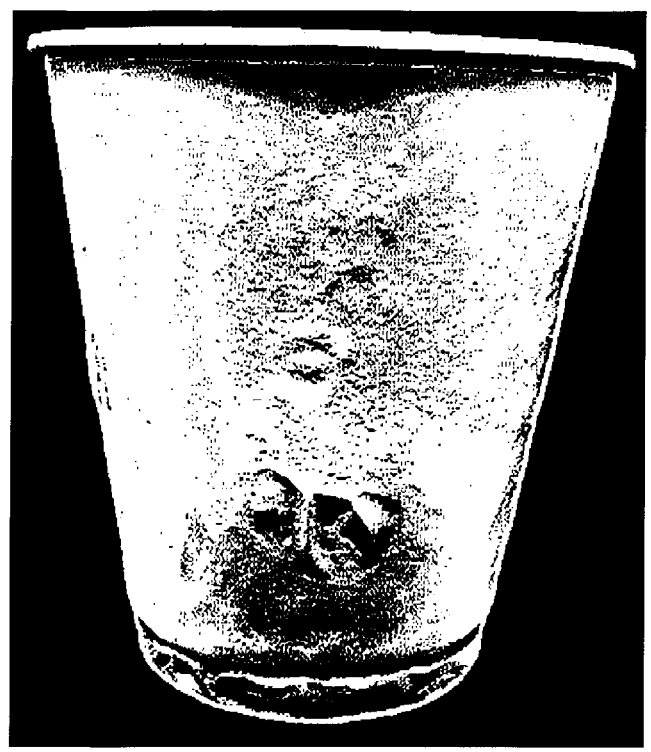
FIG. 5 shows the appearance of the heat-insulating foamed container obtained from sheet D4 (Comparative Example 4) after the microwave treatment (after 10 minutes). It can be seen that the blisters shrunk to generate large wrinkles.

The foamed layer of each of the heat-insulating foamed containers obtained from sheets C1 to C7 and sheets D1 to D4 was observed by using a stereoscopic microscope ("MULTIZOOM AZ100M (camera: DS-Ri1)" manufactured by Nikon Corporation). Then, when fine, uniform foam cells as in Example 1 (FIG. 1) were observed, the foamed layer was rated as "good", when large, nonuniform foam cells as shown for Comparative Example 1 (FIG. 2) were observed, the foamed layer was rated as "poor", and when the appearance between Example 1 and Comparative Example 1 was observed, the foamed layer was rated as "fair".

(Evaluation of Microwave Resistance)

Into each heat-insulating foamed paper container, 200 g of water was put, and the container was subjected to heat treatment with a microwave oven (1000 W) for 5 minutes, and the appearance of each heat-insulating foamed paper container immediately after the treatment was observed. Then, containers without generation of blisters were rated as "good", containers with generation of blisters having a diameter of 5 mm or smaller were rated as "fair", and containers with generation of blisters having a diameter of larger than 5 mm were rated as "poor".

Low rating after primary foaming (nonuniform foam cells) also tended to be associated with low microwave resistance. If nonuniform, coarse foam cells have been generated in the stage of primary foaming, it is considered that the foam cells blister to overstretch the polyethylene resin in microwave treatment (secondary foaming), leading to the loss of the heat-insulating properties.

Even when uniform foam cells were present in the stage of primary foaming, blisters were generated when the density of the polyethylene resin was low. This is probably because if the density of the polyethylene resin is low (the melting point is low), the polyethylene resin softens and/or melts to bloat foam cells in microwave treatment.

The invention claimed is:

1. A method for producing a sheet for a heat-insulating foamed paper container, the method comprising laminating a polyethylene resin on at least one surface of a paper substrate,
    wherein laminate conditions include an air gap in a range of 160 mm or larger and a drawing speed in a range of 65 m/min or lower, and
    wherein a density of the polyethylene resin is in a range from 923 to 930 kg/m$^3$.

2. The method for producing a sheet for a heat-insulating foamed paper container according to claim 1, wherein a melting point of the polyethylene resin in a range from 111 to 115° C.

3. The method for producing a sheet for a heat-insulating foamed paper container according to claim 1, wherein the polyethylene resin after lamination has a thickness in a range from 30 to 150 μm.

4. The method for producing a sheet for a heat-insulating foamed paper container according to claim 1, wherein a melt flow rate of the polyethylene resin is in a range from 6 to 10 g/10 min.

5. The method for producing a sheet for a heat-insulating foamed paper container according to claim 1, wherein an air gap-passing time is in a range from 0.16 to 0.30 seconds.

6. The method for producing a sheet for a heat-insulating foamed paper container according to claim 4, wherein an air gap-passing time is in a range from 0.16 to 0.30 seconds.

* * * * *